United States Patent
Rivkin et al.

(10) Patent No.: US 9,449,618 B2
(45) Date of Patent: Sep. 20, 2016

(54) MICROWAVE ASSISTED MAGNETIC RECORDING SYSTEM

(75) Inventors: Kirill Aleksandrovich Rivkin, Edina, MN (US); Ned Tabat, Chanhassen, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 986 days.

(21) Appl. No.: 12/427,534

(22) Filed: Apr. 21, 2009

(65) Prior Publication Data
US 2009/0262457 A1    Oct. 22, 2009

Related U.S. Application Data

(60) Provisional application No. 61/046,676, filed on Apr. 21, 2008.

(51) Int. Cl.
   *G11B 5/127*    (2006.01)
   *G11B 5/00*     (2006.01)

(52) U.S. Cl.
   CPC ....... *G11B 5/1278* (2013.01); *G11B 2005/001* (2013.01)

(58) Field of Classification Search
   None
   See application file for complete search history.

(56) References Cited

U.S. PATENT DOCUMENTS

| | | | |
|---|---|---|---|
| 5,075,956 A | 12/1991 | Das | |
| 5,717,547 A | 2/1998 | Young | |
| 5,737,152 A | 4/1998 | Balakrishnan | |
| 6,011,664 A * | 1/2000 | Kryder et al. | 360/59 |
| 6,038,102 A | 3/2000 | Balakrishnan et al. | |
| 6,114,756 A | 9/2000 | Kinsman | |
| 6,665,136 B2 | 12/2003 | Clinton et al. | |
| 6,771,445 B1 * | 8/2004 | Hamann et al. | 360/59 |
| 6,940,697 B2 | 9/2005 | Jang et al. | |
| 7,095,292 B2 | 8/2006 | Sayanagi et al. | |
| 7,212,367 B2 | 5/2007 | Clinton et al. | |
| 7,256,955 B2 * | 8/2007 | Pokhil et al. | 360/68 |
| 7,330,090 B2 | 2/2008 | Itoh et al. | |
| 7,678,476 B2 * | 3/2010 | Weller et al. | 428/828.1 |
| 7,791,838 B2 * | 9/2010 | Sato et al. | 360/125.02 |
| 2003/0039068 A1 | 2/2003 | Crawford et al. | |
| 2005/0023938 A1 | 2/2005 | Sato et al. | |
| 2005/0219771 A1 * | 10/2005 | Sato et al. | 360/324.2 |

(Continued)

FOREIGN PATENT DOCUMENTS

EP    0 522 524 B1    12/1993

OTHER PUBLICATIONS

K. Rivkin et al., "Time-Dependent Fields and Anisotropy Dominated Magnetic Media", from Applied Physics Letters 92, 153104 (Apr. 15, 2008).

*Primary Examiner* — Kevin Bernatz
(74) *Attorney, Agent, or Firm* — Hollingsworth Davis, LLC

(57) ABSTRACT

A microwave assisted magnetic recording system includes a write pole that generates a write magnetic field, an element that generates a radio frequency assist magnetic field, and a recording medium that moves relative to the write pole. The recording medium is exposed to the radio frequency assist magnetic field before it is exposed to the write magnetic field. One possible element that generates the radio frequency assist magnetic field is an assist wire placed perpendicular to the write pole. Alternatively, the assist wire can be placed parallel to the write pole so that its radio frequency assist magnetic field couples with the write pole, which in turn generates its own coupled radio frequency magnetic field along with the write magnetic field.

19 Claims, 3 Drawing Sheets

(56) References Cited

U.S. PATENT DOCUMENTS

| | | |
|---|---|---|
| 2006/0198047 A1* | 9/2006 | Xue et al. .................... 360/126 |
| 2008/0019040 A1* | 1/2008 | Zhu et al. .................... 360/110 |
| 2008/0112087 A1 | 5/2008 | Clinton et al. |
| 2008/0117545 A1* | 5/2008 | Batra et al. .............. 360/125.01 |
| 2008/0137224 A1* | 6/2008 | Gao et al. ..................... 360/55 |
| 2008/0259493 A1* | 10/2008 | Kief et al. ............... 360/119.01 |
| 2008/0316643 A1* | 12/2008 | Linville et al. ............... 360/110 |
| 2009/0002895 A1* | 1/2009 | Pust et al. ..................... 360/319 |
| 2009/0080120 A1* | 3/2009 | Funayama et al. ........... 360/319 |
| 2009/0262636 A1* | 10/2009 | Xue et al. .................... 369/126 |
| 2010/0309577 A1* | 12/2010 | Gao et al. ...................... 360/75 |
| 2011/0063756 A1* | 3/2011 | Linville et al. ............ 360/125.3 |

* cited by examiner

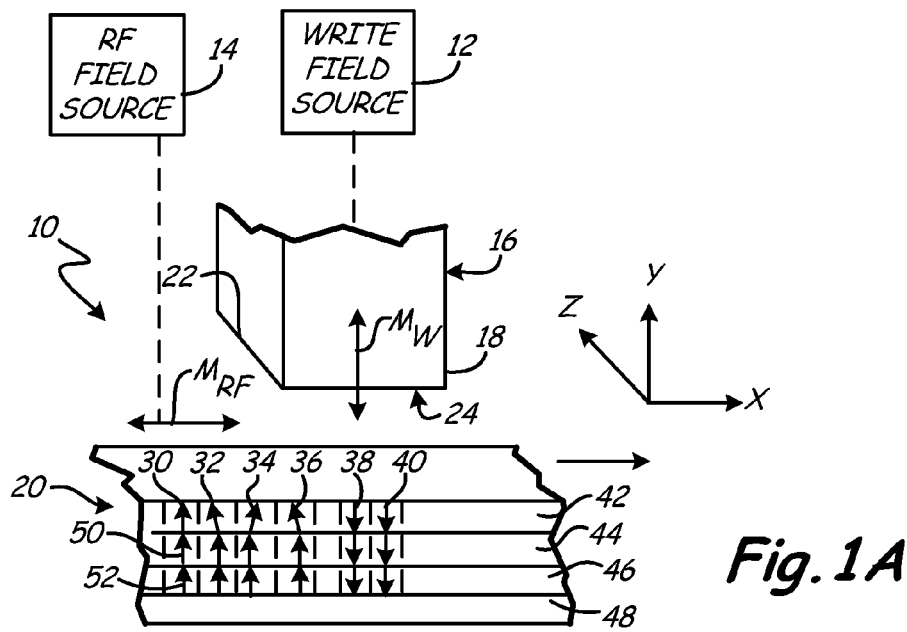
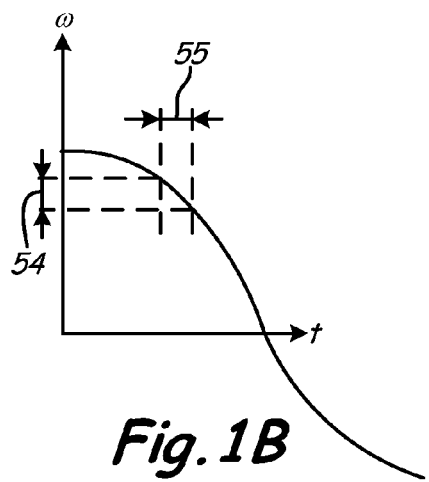
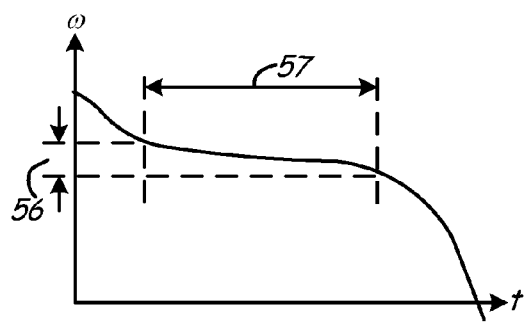
Fig. 1A
Fig. 1B
Fig. 1C

MICROWAVE ASSISTED MAGNETIC RECORDING SYSTEM

REFERENCE TO RELATED APPLICATION

This application claims benefit from U.S. provisional patent application No. 61/046,676, entitled "OPTIMIZATION OF MICROWAVE ASSISTED MAGNETIZATION REVERSAL," filed Apr. 21, 2008 by K. Rivkin et al., which is incorporated by reference.

BACKGROUND

This invention relates generally to the field of electronic data storage and retrieval systems. In particular, the present invention relates to a microwave assisted recording system.

A magnetic data storage and retrieval system typically includes a writer for storing magnetically encoded information on a magnetic medium and a reader for retrieving the magnetically encoded information from the magnetic medium. The writer typically includes one or more magnetic poles surrounded by a conductive coil. To write data to the magnetic medium, a time varying write current is caused to flow through the conductive coil, which in turn produces a time varying magnetic field through the poles. The magnetic medium is then passed near the air bearing surface (ABS) of the writer at a predetermined distance such that the medium passes through the magnetic field. As the write current changes in direction and magnitude, the magnetic field changes in direction and magnitude as well. In a typical magnetic writer, a sufficient magnetic field must be applied to write to the magnetic medium. More specifically, the field produced by the head at the magnetic medium must be of sufficient magnitude to overcome the high coercivity of the magnetic medium.

As data storage densities in magnetic recording continue to progress in an effort to increase the storage capacity of hard disc drives, magnetic transition (bit) dimensions and recording head critical features are being pushed below 100 nm. In addition, making the recording medium stable at higher areal densities requires magnetically harder (high coercivity) storage medium materials. Typically, writing on such media requires a high magnitude magnetic field. Currently, magnetic writers are based on the idea of focusing the magnetic field from the pole towards the magnetic media.

It has been proposed that the effective writability to magnetic media can be improved if addition to a "direct current" (DC) write field (i.e. a magnetic field with a frequency below 5 GHz) created by the writer and possibly other sources, a radio frequency (RF) assist field is simultaneously applied to the media. This type of recording is referred to as microwave assisted magnetic recording (MAMR). In a conventional setup the RF assist fields are required to coincide in the media spatially with the DC or low frequency write fields. Several factors, however, limit the practicality of this writing method, including the fact that the effective writability gradient depends on both RF and DC gradients and their mutual alignment and the need to create sufficiently high RF assist fields.

SUMMARY

The present invention is a microwave assisted magnetic recording system that includes a write pole that generates a write magnetic field and an element that generates a radio frequency assist magnetic field. A recording medium moves relative to the write pole and is subjected to the radio frequency magnetic field prior to being subjected to the direct current magnetic field.

Another aspect of the invention is a microwave assisted magnetic recording system that includes a write pole that generates a write magnetic field and an element that generates a radio frequency assist magnetic field that couples to the write field in a plane parallel to the recording medium such that precession of magnetization in the write pole creates a coupled radio frequency magnetic field.

Another aspect of the invention is a microwave assisted magnetic recording system that includes a write pole that generates a write magnetic field and an element that generates a radio frequency assist magnetic field that is substantially circularly polarized. A recording medium moves relative to the write pole and is subjected to the substantially circularly polarized radio frequency magnetic field prior to being subjected to the direct current magnetic field.

In another aspect, the invention uses a recording medium comprised of multiple recording layers of varying anisotropies which couple the recording medium to the radio frequency assist magnetic field.

BRIEF DESCRIPTION OF THE DRAWINGS

FIG. 1A is a schematic diagram of a preassisted MAMR recording system.

FIG. 1B is a graphical representation of the resonance frequency versus reversal time in a MAMR system with a single layer recording medium.

FIG. 1C is a graphical representation of the resonance frequency versus reversal time in a MAMR system where a multi-layer recording medium is designed to couple with the resonant frequency of the system.

DETAILED DESCRIPTION

Figure 2:
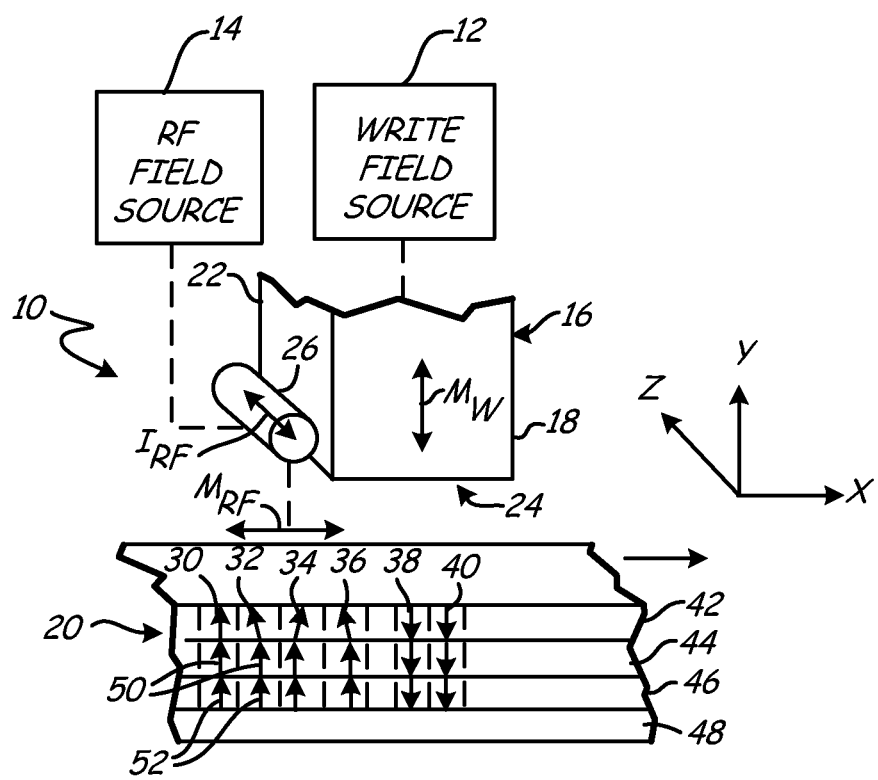
FIG. 2 is a schematic diagram of a preassisted MAMR system with a perpendicular assist wire radio frequency source.

FIG. 1A illustrates a schematic representation of preassisted microwave assisted magnetic recording system (MAMR) 10, which includes direct current (DC) write magnetic field source 12, radio frequency (RF) magnetic field source 14, write pole 16, write pole tip 18, and magnetic medium 20. Digital data are stored in magnetic medium 20 as magnetic medium 20 relatively moves past write pole tip 18 in the x-direction shown in FIG. 1A. The storage of digital data is achieved using DC write field $M_W$ produced by write field source 12 in conjunction with RF assist magnetic field $M_{RF}$ produced by RF field source 14. Write field source 12, which typically includes a write current driver and a write coil (not shown), generates write field $M_W$ which is delivered through write pole 16 and write pole tip 18 in a direction perpendicular to the plane of magnetic medium 20. The direction of write field $M_W$ determines the magnetic direction of stored data on magnetic medium 20. DC write field $M_W$ not only refers to direct current (zero frequency) magnetic fields, but to low frequency (under 5 GHz) magnetic fields as well.

RF field source 14 generates RF assist field $M_{RF}$ at or near leading edge 22 of write pole tip 18. RF field source 14 can include an RF generator as well as any element capable of emitting a radio frequency magnetic field such as an antenna, wire, or other like apparatuses. Thus, as magnetic medium 20 moves in the x-direction with respect to write pole tip 18, it is subjected to RF field $M_{RF}$ prior to being subjected to DC field $M_W$. More specifically, RF field $M_{RF}$ is responsible for creating a resonant frequency in magnetic medium 20 that lowers the effective coercivity of magnetic medium 20 before magnetic medium 20 is subjected to the maximum amplitude of DC field $M_W$. This configuration is referred to as a "preassist" configuration, i.e. when RF field $M_{RF}$ precedes DC field $M_W$ in magnetic medium 20. Domains 30, 32, 34, and 36 are passed through RF field $M_{RF}$ and magnetization directions in domains 38 and 40 are reversed (in the y-axis direction) when they are subjected to DC field $M_W$.

Magnetic medium 20 is disposed under write pole tip 18 and moves in the x-direction shown in FIG. 1A. Magnetic medium 20 has perpendicular anisotropy and high coercivity. Write pole tip 18 flies over magnetic medium 20 on air bearing surface (ABS) 24. Magnetic medium 20 is referred to as having perpendicular anisotropy relative to the plane of ABS 24 (parallel to the y-axis).

RF field $M_{RF}$ is generally elliptically polarized; the direction of RF field $M_{RF}$ follows an elliptical path as a function of time in the ABS 24 (x-z) plane. In a preassist configuration such as MAMR system 10 in FIG. 1A, a substantially circularly polarized RF field $M_{RF}$ shows benefits as compared to generally elliptically or linearly polarized RF field $M_{RF}$. When RF field $M_{RF}$ is circularly polarized, extra writability to magnetic medium 20 is possible, i.e. writability is shown for a wider range of RF field $M_{RF}$ frequencies and a wider range of anisotropies for magnetic medium 20. Moreover, where writability is shown, the probabilities of magnetization directions in domains such as 30, 32, 34, and 36 switching to directions such as those shown in domains 38 and 40 are high along magnetic medium's 20 range of anisotropies from 2 KOe to upwards of 12 KOe; the range of the RF field $M_{RF}$ frequencies is anywhere from 2 GHz to upwards of 25 GHz. In addition, in many areas of writability where the probability of switching is high, the separation between close to 100% switching probability and close to 0% probability is in sharp contrast. When the writability is mapped out with the writable anisotropy of magnetic medium 20 vs. the frequency of RF field $M_{RF}$, this phenomenon of sharp contrast appears at a range of roughly 8 KOe to 14 KOe for the anisotropy and a range of roughly 15 GHz to 25 GHz for the frequency. The phenomenon of sharp contrast means that circularly polarized RF fields can provide sharper write contours, cleaner transition parameters, and reduce jitter as compared to generally elliptically or linearly polarized RF fields. This remains true even if a MAMR system is not using a preassist configuration but is instead using a conventional configuration where RF field $M_{RF}$ is applied to magnetic medium 20 at the same time as or slightly after DC field $M_W$.

Magnetic medium 20 can be a multilayer recording medium as depicted in FIG. 1A. Magnetic medium 20 may contain any number of recording layers from two or more, although three are shown here as hard recording layers 42, 44, and 46. In addition, magnetic medium 20 may contain soft underlayer (SUL) 48, or any other number of soft underlayers. Recording layer 42 has magnetization domains 30, 32, 34, 36, 38, and 40 as mentioned previously. Recording layers 44 and 46 have domain group 50 and domain group 52 that correspond to the aforementioned domains of recording layer 42. SUL 48, which has a lower anisotropy than any of recording layers 42, 44, or 46, plays a role as known in the art by providing a return flux path and enhancing DC field $M_W$.

FIG. 1B shows a graph of how the resonant frequency ω of a typical conventional MAMR single storage layer medium changes vs. time t during recording (i.e. magnetization reversal). Range 54 shows the range of frequencies that is useful for MAMR and range 55 shows the amount of time those frequencies are useful for the magnetization reversal time in write pole 16. Although the useful range zone 54 seems small compared to the entire range of frequencies through the magnetization reversal, it has been demonstrated to be at least of minimal usefulness in MAMR.

FIG. 1C shows a graph similar to 1B, only this graph shows frequency ω vs. time t for a MAMR system where magnetic medium 20 has multiple hard recording layers 42, 44, and 46 of varying properties such as their anisotropies, thicknesses, and exchange coupling between them. The anisotropies of recording layers 42, 44, and 46 may be different from one another by at least a factor of two and preferably by a factor of up to about five. The properties of recording layers 42, 44, and 46 can be tailored such that some or all of them create extra RF fields in the other layers of medium 20, and/or they can be tailored such that some or all of the layers copy the same resonance frequency as the resonance frequency of RF field $M_{RF}$. In this way, a MAMR system can be created in which the resonance frequency remains almost constant during a large portion of the magnetization reversal, as shown by ranges 56 and 57 in FIG. 1C. Range 57 is substantially larger than range 55 in the conventional single layer system, therefore the MAMR effect is greatly enhanced by preserving resonant coupling between the RF fields and magnetic medium 20 for a longer period of time during the magnetization reversal in write pole 16.

FIG. 2 shows a schematic representation of preassisted microwave assisted magnetic recording system (MAMR) 10, which includes direct current (DC) write magnetic field source 12, radio frequency (RF) assist magnetic field source 14, write pole 16, write pole tip 18, and magnetic medium 20. Digital data are stored in magnetic medium 20 as magnetic medium 20 relatively moves past write pole tip 18 in the x-direction shown in FIG. 1A. The storage of digital data is achieved using DC write field $M_W$ produced by write field source 12 in conjunction with RF assist magnetic field $M_{RF}$ produced by RF field source 14. Write field source 12, which typically includes a write current driver and a write coil (not shown), generates write field $M_W$ which is delivered through write pole 16 and write pole tip 18 in a direction perpendicular to the plane of magnetic medium 20. The direction of write field $M_W$ determines the magnetic direction of stored data on magnetic medium 20. DC write field $M_W$ not only refers to direct current (zero frequency) magnetic fields, but to low frequency (under 5 GHz) magnetic fields as well.

RF field source 14 generates RF assist field $M_{RF}$. RF field source 14 in this particular embodiment is assist wire 26, of which only a section or portion is shown. Assist wire 26 is placed at leading edge 22 of write pole 16 running perpendicular to write pole 16 (parallel to z-axis). Current $I_{RF}$ is passed through assist wire 26 to create RF field $M_{RF}$. Current $I_{RF}$ is typically an alternating current at a radio frequency and per the right hand rule creates RF field $M_{RF}$ in magnetic medium 20 in ABS (x-z) plane. Because assist wire 26 is placed on leading edge 22, RF field $M_{RF}$ is generated upstream of DC field $M_W$ and magnetic medium 20 is subjected to RF field $M_{RF}$ prior to being subjected to DC field $M_W$. Or, more specifically, RF field $M_{RF}$ is responsible for creating a resonant frequency in magnetic medium 20 that lowers the effective coercivity of magnetic medium 20 before magnetic medium 20 is subjected to the maximum amplitude of DC field $M_W$. This configuration is referred to as a "preassist" configuration, i.e. when RF field $M_{RF}$ precedes DC field $M_W$ in magnetic medium 20. Recording layer 42 which contains domains 30, 32, 34, and 36 is passed through RF field $M_{RF}$ and magnetization directions in domains 38 and 40 are reversed when they are subjected to DC field $M_W$. The same activity occurs in domain groups 50 and 52 in recording layers 44 and 46.

Magnetic medium 20 is disposed under write pole tip 18 and moves in the x-direction shown in FIG. 2. Magnetic medium 20 has perpendicular anisotropy and high coercivity. Write pole tip 18 flies over magnetic medium 20 on air bearing surface (ABS) 24. Magnetic medium 20 is referred to as having perpendicular anisotropy relative to the plane of ABS 24 (parallel to the y-axis).

Figure 3:
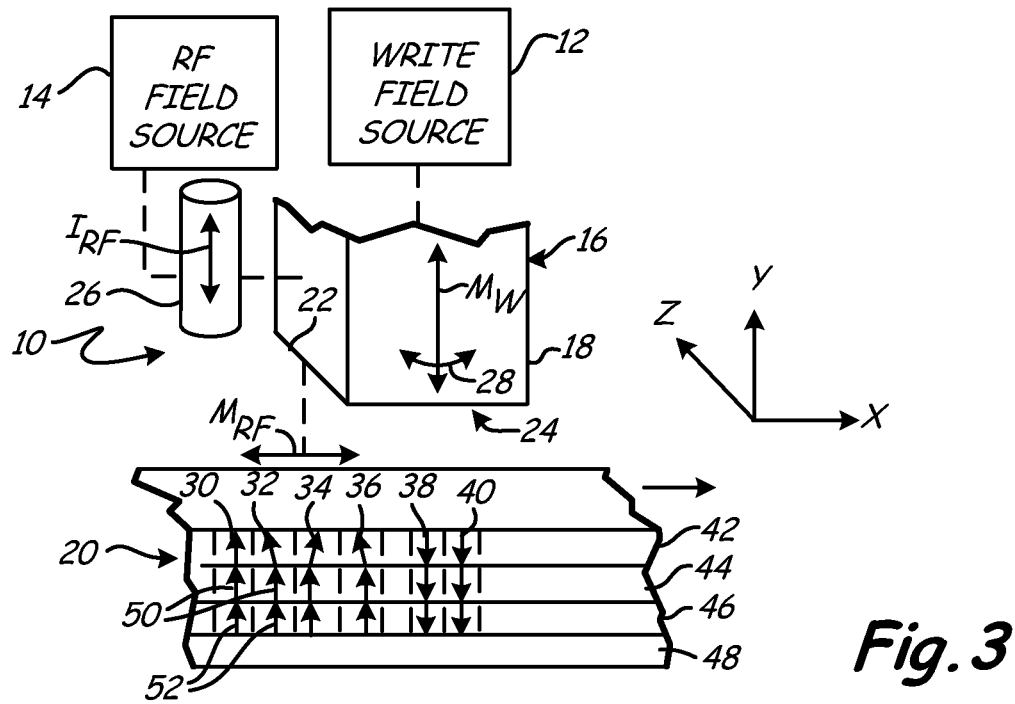
FIG. 3 is a schematic diagram of a preassisted MAMR system with a parallel assist wire exciting a write pole to generate a radio frequency assist magnetic field.

FIG. 3 shows a schematic representation of preassisted MAMR system 10, which includes direct current (DC) write magnetic field source 12, radio frequency (RF) magnetic field source 14, write pole 16, write pole tip 18, and magnetic medium 20. Digital data are stored in magnetic medium 20 as magnetic medium 20 relatively moves past write pole tip 18 in the x-direction shown in FIG. 1A. The storage of digital data in this embodiment is achieved using DC write field $M_W$ produced by write field source 12 in conjunction with RF assist magnetic field $M_{RF}$ produced by RF field source 14. Write field source 12, which typically includes a write current driver and a write coil (not shown), generates write field $M_W$ which is delivered through write pole 16 and write pole tip 18 in a direction perpendicular to the plane of magnetic medium 20. The direction of write field $M_W$ determines the magnetic direction of stored data on magnetic medium 20. DC write field $M_W$ not only refers to direct current (zero frequency) magnetic fields, but to low frequency (under 5 GHz) magnetic fields as well.

An RF assist field in this particular embodiment is produced by RF assist field source 14 and a combination of assist wire 26 (of which only a section or portion is shown) and write pole 16 itself, which is excited by the RF field created by assist wire 26. Assist wire 26 is placed at leading edge 22 of write pole 16 parallel to write pole 16 (parallel to y-axis). Current $I_{RF}$ is passed through assist wire 26 to create an RF field. In this particular embodiment shown in FIG. 3, current $I_{RF}$ is typically an alternating current at a radio frequency and the RF field produced by assist wire 26 couples with magnetization oscillations in write pole 16. Because assist wire 26 is placed parallel to write pole 16, the coupling between their magnetic fields is almost five times as effective as if the assist wire were placed in a non-parallel direction; this is especially true if write pole 16 is narrow. Essentially, write pole 16 generates RF assist field $M_{RF}$ through its own magnetic precession (represented by arrow 28) coupled with the RF field generated by assist wire 26. Therefore, write pole 16 generates both RF field $M_{RF}$ and DC field $M_W$ as a single source, and the collocation of the magnetic field gradients is better than if RF field $M_{RF}$ and DC field $M_W$ were generated from two independent sources. Because assist wire 26 is placed adjacent leading edge 22, and in spite of write pole 16 generating both RF field $M_{RF}$ and DC field $M_W$, magnetic medium 20 is still subjected to RF field $M_{RF}$ prior to being subjected to DC field $M_W$. Therefore, FIG. 3 is still considered a preassist configuration. Recording layer 42 which contains domains 30, 32, 34, and 36 is passed through RF field $M_{RF}$ and magnetization directions in domains 38 and 40 are reversed when they are subjected to DC field $M_W$. The same activity occurs in domain groups 50 and 52 in recording layers 44 and 46.

Magnetic medium 20 is disposed under write pole 16 and moves in the x-direction shown in FIG. 3. Magnetic medium 20 has perpendicular anisotropy and high coercivity. Write pole tip 24 flies over magnetic medium 20 on air bearing surface (ABS) 24. Magnetic medium 20 is referred to as having perpendicular anisotropy relative to the plane of ABS 24 (parallel to the y-axis).

As previously discussed, RF assist field $M_{RF}$ is generally elliptically polarized. Also previously discussed were the differences between linearly polarized and circularly polarized RF fields. In the embodiment shown in FIG. 3, the geometry and shape of write pole 16 and write pole tip 18 can be chosen in such a way that the semi-major and semi-minor axes of the polarization ellipse are drastically different from one another such that the polarization becomes substantially linear. In the opposite case, the geometry and shape of write pole 16 and write pole tip 18 can be chosen in such a way that the semi-major and semi-minor axes of the polarization ellipse are close to one another such that the polarization becomes substantially circular. Therefore, one is able to control the polarization of RF field $M_{RF}$ from the range of substantially linear to substantially circular by manipulating the geometry and shape of write pole 16 and write pole tip 18. Overall, the excitation of write pole 16 using parallel assist wire 26 shows good collocation of RF field $M_{RF}$ and DC field $M_W$, strong RF and DC fields $M_{RF}$ and $M_W$, and the ability to control the polarization of RF field $M_{RF}$ so that the resonant pumping of energy into magnetic medium 20 is in the correct direction.

Figure 4:
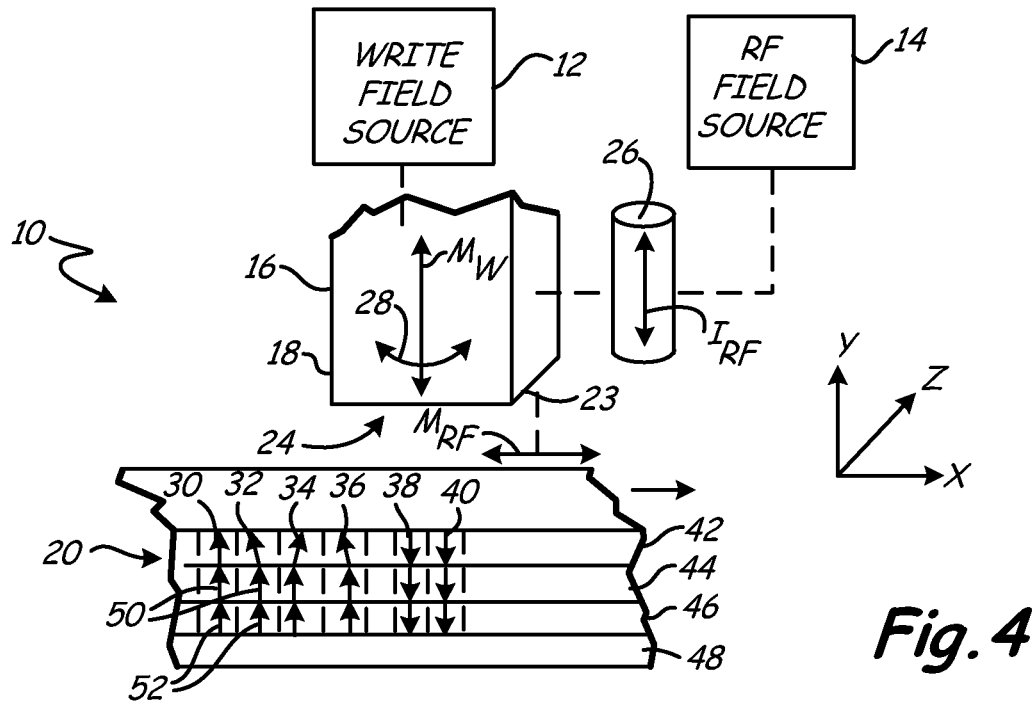
FIG. 4 is a schematic diagram of MAMR system with a parallel assist wire exciting a write pole to generate a radio frequency assist magnetic field.

FIG. 4 shows a schematic representation of microwave assisted magnetic recording system (MAMR) 10, which includes direct current (DC) write magnetic field source 12, radio frequency (RF) magnetic field source 14, write pole 16, write pole tip 18, and magnetic medium 20. Digital data are stored in magnetic medium 20 as magnetic medium 20 relatively moves past write pole tip 18 in the x-direction shown in FIG. 1A. The storage of digital data is achieved using DC write field $M_W$ produced by write field source 12 in conjunction with RF assist magnetic field $M_{RF}$ produced by RF field source 14. Write field source 12, which typically includes a write current driver and a write coil (not shown), generates write field $M_W$ which is delivered through write pole 16 and write pole tip 18 in a direction perpendicular to the plane of magnetic medium 20. The direction of write field $M_W$ determines the magnetic direction of stored data on magnetic medium 20. DC write field $M_W$ not only refers to direct (zero frequency) current, but to low frequency (under 5 GHz) magnetic fields as well.

RF field source 14 in this particular embodiment is a combination of assist wire 26, of which only a section or portion is shown, and write pole 16 itself, which is excited by the RF field created by assist wire 26. Assist wire 26 is placed at trailing edge 23 of write pole 16 parallel to write pole 16 (parallel to y-axis). Current $I_{RF}$ is passed through assist wire 26 to create an RF field. In this particular embodiment shown in FIG. 3, current $I_{RF}$ is typically an alternating current at a radio frequency and the RF field produced by assist wire 26 couples with magnetization oscillations in write pole 16. Because assist wire 26 is placed parallel to write pole 16, the coupling between their magnetic fields is almost five times as effective as if the assist wire was placed in a non-parallel direction; this is especially true if write pole 16 is narrow. Essentially, write pole 16 generates RF field $M_{RF}$ through its own magnetic precession (represented by arrow 28) coupled with the RF field generated by assist wire 26. Therefore, write pole 16 generates both RF field $M_{RF}$ and DC field $M_W$ as a single source, and the collocation of the magnetic field gradients is better than if RF field $M_{RF}$ and DC field $M_W$ were generated from two independent sources. In contrast to the embodiment depicted in FIG. 3, assist wire is placed adjacent trailing edge 23 of write pole 16. Magnetic medium 20 is still subjected to RF field $M_{RF}$, but now it is subjected to RF field 16 while being subjected to DC field $M_W$. Therefore, because magnetic medium 20 does not experience RF field $M_{RF}$ for a time period prior to DC field $M_W$, FIG. 4 is not considered a preassist configuration. Recording layer 42 contains domains 30, 32, 34, and 36 which are passed through DC field 18 and RF field 26 and magnetization directions in domains 38 and 40 are reversed. The same activity occurs in domain groups 50 and 52 in recording layers 44 and 46.

Magnetic medium 20 is disposed under write pole 16 and moves in the x-direction shown in FIG. 4. Magnetic medium 20 has perpendicular anisotropy and high coercivity. Write pole tip 24 flies over magnetic medium 20 on air bearing surface (ABS) 24. Magnetic medium 20 is referred to as having perpendicular anisotropy relative to the plane of ABS 24 (parallel to the y-axis).

As discussed in regards to FIG. 3, the geometry and shape of write pole 16 and write pole tip 18 can be chosen in such a way that one is able to control the polarization of RF field $M_{RF}$ from the range of substantially linear to substantially circular. Overall, the excitation of write pole 16 using parallel assist wire 26 shows good collocation of RF field $M_{RF}$ and DC field $M_W$, strong RF and DC fields $M_{RF}$ and $M_W$, and the ability to control the polarization of RF field $M_{RF}$ so that the resonant pumping of energy into magnetic medium 20 is in the correct direction.

Although the present invention has been described with reference to preferred embodiments, workers skilled in the art will recognize that changes may be made in form and detail without departing from the scope of the invention. The implementations described above and other implementations are within the scope of the following claims.

The invention claimed is:

1. A system comprising:
   a write pole that generates a write magnetic field;
   a write assist element that generates a substantially circularly polarized radio frequency (RF) assist magnetic field such that precession of magnetization in the write pole causes the write pole to create a coupled radio frequency assist magnetic field; and
   a recording medium that moves relative to the write pole, where the recording medium is subjected to the coupled RF assist magnetic field of the write pole prior to being subjected to the write magnetic field.

2. The system of claim 1 wherein a polarization of the polarized RF assist magnetic field is inversed after the recording medium is subjected to the write magnetic field.

3. The system of claim 1 wherein subjecting the recording medium to the coupled RF assist magnetic field lowers a coercivity of the recording medium before the recording medium is subjected to the write magnetic field.

4. The system of claim 1 wherein the substantially circularly polarized radio frequency assist magnetic field has a resonance frequency that remains substantially constant for a duration of a magnetization reversal that is greater than that associated with a resonance frequency of a linearly polarized RF assist magnetic field.

5. The system of claim 1 wherein the write assist element comprises an assist wire positioned parallel to the write pole adjacent a leading edge of the write pole.

6. The system of claim 1 wherein the write assist element radio frequency assist magnetic field couples to the write pole in a plane parallel to the recording medium.

7. The system of claim 1 wherein the recording medium has a anisotropy of up to 20 kOe.

8. A system comprising:
   a write pole that generates a write magnetic field;
   a recording medium that moves relative to the write pole; and
   a write assist element that generates a radio frequency assist magnetic field that couples to the write pole in a plane parallel to the recording medium such that precession of magnetization in the write pole causes the write pole to create a coupled substantially circularly polarized radio frequency assist magnetic field and deliver the substantially circularly polarized radio frequency assist magnetic field to the recording medium.

9. The system of claim 8 wherein the recording medium is subjected to the coupled radio frequency assist magnetic field before it is subjected to the write magnetic field.

10. The system of claim 9 wherein the write assist element comprises an assist wire positioned on a leading edge of the write pole and parallel to the write pole.

11. The system of claim 9, wherein
    a polarization of the coupled radio frequency assist magnetic field is inversed after the recording medium is subjected to the write magnetic field.

12. The system of claim 8 wherein subjecting the recording medium to the coupled magnetic field lowers a coercivity of the recording medium before the recording medium is subjected to the write magnetic field.

13. The system of claim 8 wherein the coupled magnetic field has a resonance frequency that remains substantially constant for a duration of a magnetization reversal that is greater than that associated with a resonance frequency of a linearly polarized radio frequency assist magnetic field.

14. The system of claim 8 wherein the write assist element comprises an assist wire positioned adjacent a trailing edge of the write pole and parallel to the write pole.

15. The system of claim 8 wherein the recording medium has anisotropy of up to 20 kOe.

16. A system comprising:
    a write assist element that generates a first radio frequency assist magnetic field that is substantially circularly polarized;
    a write pole that generates a write magnetic field and, in response to magnetic precession of the write pole coupled with the first radio frequency assist magnetic field, generates a second radio frequency assist magnetic field, and wherein magnetic field gradients for the write magnetic field and the second radio frequency assist magnetic field are collocated; and
    a recording medium that moves relative to the write pole, where the recording medium is subjected to the second radio frequency assist magnetic field prior to being subjected to the write magnetic field.

17. The system of claim 16, wherein
    a polarization of the polarized radio frequency assist magnetic field is inversed after the recording medium is subjected to the write magnetic field.

18. The system of claim 16 wherein
    the write assist element comprises an assist wire positioned on a leading edge of the write pole and parallel to the write pole.

19. The system of claim 16, wherein the recording medium has anisotropy of up to 20 kOe.

* * * * *